United States Patent
Kawauchi et al.

(10) Patent No.: US 7,207,221 B2
(45) Date of Patent: Apr. 24, 2007

(54) VIBRATION TYPE GYROSCOPE AND METHOD FOR MANUFACTURING VIBRATION TYPE GYROSCOPE

(75) Inventors: Osamu Kawauchi, Shiojiri (JP); Shigeki Miyazawa, Tatsuno (JP); Katsumi Takayama, Kamiinagunminowa (JP); Keiichi Yamaguchi, Kamiinagunminowa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/239,698

(22) Filed: Sep. 29, 2005

(65) Prior Publication Data
US 2006/0070442 A1    Apr. 6, 2006

(30) Foreign Application Priority Data
Sep. 30, 2004    (JP)    ............................. 2004-288716

(51) Int. Cl.
*G01P 9/04* (2006.01)
(52) U.S. Cl. .................................................. 73/504.12
(58) Field of Classification Search ............. 73/504.02, 73/504.04, 504.12, 504.16, 504.15; 310/370, 310/311, 321, 330, 312
See application file for complete search history.

(56) References Cited

U.S. PATENT DOCUMENTS

| | | | | |
|---|---|---|---|---|
| 3,683,213 A | * | 8/1972 | Staudte | 310/312 |
| 3,697,766 A | * | 10/1972 | Ganter et al. | 310/348 |
| 4,377,765 A | * | 3/1983 | Kogure et al. | 310/312 |
| 4,379,244 A | * | 4/1983 | Dinger | 310/312 |
| 6,236,140 B1 | * | 5/2001 | Arimura | 310/312 |
| 6,249,074 B1 | * | 6/2001 | Zimnicki et al. | 310/312 |
| 6,262,520 B1 | * | 7/2001 | Knowles | 310/370 |
| 6,414,569 B1 | * | 7/2002 | Nakafuku | 333/188 |
| 6,701,785 B2 | * | 3/2004 | Knowles et al. | 73/504.16 |
| 2002/0021059 A1 | * | 2/2002 | Knowles et al. | 310/370 |

FOREIGN PATENT DOCUMENTS

JP    11-072334    3/1999

* cited by examiner

*Primary Examiner*—Helen Kwok
(74) *Attorney, Agent, or Firm*—Harness, Dickey & Pierce, P.L.C.

(57) ABSTRACT

A piezo-electric vibration reed 1 including connection arms extended in opposing directions from a base 12, drive arms extended in a direction perpendicular to the connection arms at the respective tips of the connection arms 13 and 14, and detection arms extended from the base 12 in a direction perpendicular to the connection arms. In the respective tips of the drive arms, and the detection arms, there are formed a first deadweight portion and a second deadweight portion, which are adjustment portions used for mass adjustment. The adjustment portions are formed of deadweight layers and an electrode film.

15 Claims, 6 Drawing Sheets

-- PRIOR ART --

VIBRATION TYPE GYROSCOPE AND METHOD FOR MANUFACTURING VIBRATION TYPE GYROSCOPE

TECHNICAL FIELD

The present invention relates to a vibration-type gyroscope for detecting a rotation angular velocity of rotation being applied to a piezo-electric vibration reed. The vibration-type gyroscope havs the piezo-electric vibration reed mounted therein. The present invention also relates to a method for manufacturing vibration-type gyroscopes.

RELATED ART

Conventionally, as an angular velocity sensor for detecting a rotation angular velocity, vibration-type gyroscopes using a piezo-electric vibration reed have been in use for detection of camera shake or the like of VTRs and still cameras. An example of such a vibration-type gyroscope will be described using an accompanying drawing. FIG. 8 is a plane view showing an example of a piezo-electric vibration reed of the conventional vibration-type gyroscope. As shown in FIG. 8, in a main arm 102 of a piezo-electric vibration reed 100, a base 103 extends vertically from a stationary portion 101. One end 103a of the base 103 is fixed to the stationary portion 101. In the base 103, detection sections 105a and 105b are provided. In another end 103b side of the base 103, there are provided bending vibration reeds 104a and 104b which are two drive sections extending perpendicularly to the base 103. In the bending vibration reeds 104a and 104b, excitation portions 106a, 106b, 106c, and 106d are provided (for example, Patent Document 1).

Upon application of a driving voltage to the excitation portions 106a, 106b, 106c, and 106d, the bending vibration reeds 104a and 104b will send/vibrate in the directions of Arrow A and Arrow B, respectively. If the piezo-electric vibration reed 100 rotates in the direction of Arrow w in the X-Y plane, a Coriolis force will be applied to each of the piezo-electric vibration reeds 104a and 104b, and this Coriolis force will propagate to the base 103. Thereby, the base 103 will bend/vibrate in the direction of Arrow D centered on a connecting portion 126. The bending/vibration of base 103 is detected at detection sections 105a and 105b, and a signal corresponding to the detected bending/vibration is output, thereby detecting the rotation angular speed.

In a vibration-type gyroscope, in order to make the measurement sensitivity favorable, it is desirable to have a constant vibration frequency difference (hereinafter, referred to as the "detuning frequency") between the intrinsic resonance frequency of the bending vibration reeds 104a and 104b and the intrinsic resonance frequency of the base 103 which is the detection section. Furthermore, in the vibration-type gyroscope, the intrinsic resonance frequencies of the bending vibration reeds 104a and 104b are adjusted in order to prevent leakage propagation to the base of the bending vibration caused by the difference (unbalance) in the intrinsic resonance frequencies of the respective bending vibration reeds 104a and 104b. Adjustment of such intrinsic resonance frequencies is carried out varying the mass of the base 103 and bending vibration reeds 104a and 104b.

For example, in the piezo-electric vibration reed 100 shown in FIG. 8, there is provided, on the other end portion 103b side of the base 103, a projection 135 projecting from the bending vibration reeds 104a and 104b. The intrinsic resonance frequency of the base 103 is varied applying processing for removing mass from one part 137 of the projection 135. Moreover, the respective intrinsic resonance frequencies of the bending vibration reeds 104a and 104b are varied, respectively and independently, by applying processing for removing mass from the parts 136A and 136B at each tip side of the respective bending vibration reeds 104a and 104b. Removal processing of these mass is carried out, for example, by removing thin film formed in the surface of the piezo-electric vibration reed 100 with laser irradiation.

[Patent Document 1]
Japanese laid-open patent publication No. 11-72334

However, because in the mass removal processing described above, the thickness of thin film formed in the surface of the piezo-electric vibration reed 100 is formed substantially uniform and the diameter of laser irradiation is also uniform, the mass of the thin film to be removed by one shot of laser irradiation will be substantially constant. The change amount of mass required here varies for every piezo-electric vibration reed due to the variations or the like in manufacturing of the piezo-electric vibration reeds and large mass changes may be often required. In this way, when desiring large mass changes, it is possible by removing thin film having a large area. However, because a large area is to be processed, the processing time will be long or the large processing area will be required, thereby preventing miniaturization of the piezo-electric vibration reed. In order to cope with these situations, increasing of the removal amount with one shot of laser irradiation by thickening the thickness of the thin film in the removal portion is employed, however, on the other hand it is impossible to remove fine mass smaller than the removal amount of mass with one shot of laser irradiation, and thus a fine adjustment to be finally required is difficult. In other words, there is a problem that it is difficult to carry out an adjustment of a large intrinsic resonance frequency and a fine adjustment of the intrinsic resonance frequency simultaneously.

The present invention has been made in view of the above problem, and the invention is intended to provide a vibration-type gyroscope in which a coarse adjustment and fine adjustment of respective intrinsic resonance frequencies can be carried out varying a minimum removal amount that can be removed with the use of a mass removal apparatus, and to provide a method of manufacturing a vibration-type gyroscope.

SUMMARY OF THE INVENTION

In order to resolve such problem, the vibration-type gyroscope of the present invention is a vibration-type gyroscope that detects a rotation angular velocity of rotation to be applied to a piezo-electric vibration reed. The piezo-electric vibration reed includes a base; a drive section for carrying out a predetermined vibration, the drive section being provided through a supporting beam extended from the base; a detection section for detecting a detection vibration caused by a Coriolis force involved in rotation of the drive section, the detection section being extended from the base into a same plane as that of the drive section; a first deadweight portion used for characteristic adjustment of the piezo-electric vibration reed, the first deadweight portion being formed in roughly a tip portion of the drive section; and a second deadweight portion used for characteristic adjustment of the piezo-electric vibration reed, the second deadweight portion being formed in roughly a tip portion of the detection section. At least one of the first deadweight portion and the second deadweight portion is formed of a plurality of adjustment portions having different mass per unit area.

According to the vibration-type gyroscope of the present invention, at least two adjustment portions having different mass per unit area are formed in at least one of the first deadweight portion and second deadweight portion. Accordingly, when it is desirable to change the mass greatly (coarse adjustment) an adjustment portion having a large mass per unit area can be removed, and when it is desirable a finely change the mass (fine adjustment), an adjustment portion whose mass per unit area is small can be removed. Namely, as for the adjustment of mass, firstly in the adjustment portion having a large mass per unit area a large mass change is carried out in a short time period, and subsequently in the adjustment portion having a small mass per unit area a fine final adjustment can be carried out. Accordingly, it is possible to carry out a coarse adjustment and a fine adjustment in one deadweight portion without increasing the area of the adjustment portion and without increasing the processing time. In other words, it is possible to provide a vibration-type gyroscope, in which a coarse adjustment and fine adjustment of the respective intrinsic resonance frequencies can be carried out in the adjustment portion having one relatively small area.

Moreover, it is desirable that the mass of the first deadweight portion be set to be smaller than the mass of the second deadweight portion.

In this manner, the adjustment of the detection section requiring the adjustment of a relatively large mass is carried out in the adjustment portion having a large mass per unit area, and the adjustment of the drive section requiring the adjustment of a relatively small mass is carried out in the adjustment portion having a small mass per unit area. Namely, the time required for the adjustment can be reduced by which allows for more efficient mass adjustment to be carried out.

Moreover, it is desirable that relative to a section out of the drive section and the detection section in which section the adjustment portion is formed, in the drive section the adjustment portion is formed over the entire region in the direction roughly perpendicular to the extending direction of the drive section, and in the detection section the adjustment portion is formed over the entire region in the direction roughly perpendicular to the extending direction of the detection section.

In this manner, the dimension of the adjustment portion can be set taking into consideration the displacement of formation positions in the direction roughly perpendicular to the direction going toward the respective tips of the drive section and detection section (hereinafter, referred to as the "width direction"), the displacement being produced in forming the adjustment portions. Namely, by setting the width dimension of the adjustment portion to be larger than the dimension in the width direction of the drive section and detection section, the adjustment portion is formed always covering the entire region of the width direction of the drive section or the detection section even if the position displacement of formations occurs. Thus, it is possible to prevent variations of the mass of the adjustment portion caused by the fact that one end of the adjustment portion may come off from the width direction of the drive section or the detection section because of position displacement, and that the other end may enter the inside of the drive section or the detection section. In other words, it is possible to reduce the variation of the intrinsic resonance frequencies of the adjustment portion and drive section.

Moreover, it is desirable that at least one of the first deadweight portion and the second deadweight portion be formed of a plurality of adjustment portions with different thicknesses.

In this manner, at least two adjustment portions with different thickness are formed in at least one of the first deadweight portion and the second deadweight portion. Accordingly, when desiring to change the mass greatly (coarse adjustment) the adjustment portion with a large thickness can be removed, and when desiring a fine change (fine adjustment), the adjustment portion with a small thickness can be removed. Namely, as for the adjustment of mass, in the adjustment portion with a large thickness a large mass change can be made in a short time period, and subsequently in the adjustment portion with a small thickness a fine final adjustment can be made. Accordingly, it is possible to make a coarse adjustment and a fine adjustment in one deadweight portion without increasing the area of the adjustment portion and without increasing the processing time.

Moreover, it is desirable that the adjustment portion in the first deadweight portion and the adjustment portion in the second deadweight portion be formed of a same thickness using a same metal.

In this manner, the adjustment portion in the first deadweight portion and the adjustment portion in the second deadweight portion can be formed in a same formation step. In other words, it is possible to form the adjustment portion in the first deadweight portion and the adjustment portion in the second deadweight portion efficiently, and a vibration-type gyroscope with low manufacturing cost can be provided.

Moreover, it is desirable that in the plurality of adjustment portions with different thickness the thickness of the adjustment portion at a side near the tip of the drive section or the detection section be formed thicker than the thickness of the other adjustment portion.

In this manner, because the thickness of the adjustment portion in the tip portion is thick, the tip portion being susceptible to the effect of mass changes, the coarse adjustment can be carried out more efficiently. Moreover, by forming an adjustment portion having a small thickness in the other portion, the other portion being relatively not susceptible to the effect of mass changes, it is possible to make a fine adjustment to be carried out easily.

Moreover, it is possible to provide a vibration-type gyroscope including a retainer and a piezo-electric vibration reed mounted in the retainer.

Moreover, it is possible to provide a vibration-type gyroscope that includes a retainer; a piezo-electric vibration reed mounted in the retainer; and a circuit element having a circuit for driving at least the piezo-electric vibration reed, the circuit element being mounted in the retainer.

The method of manufacturing a vibration type gyroscope according to the present invention is a method for manufacturing a vibration-type gyroscope provided with a piezo-electric vibration reed having a drive section for carrying out a predetermined vibration and a detection section for detecting a detection vibration caused by a Coriolis force involved in rotation of the drive section The method includes the steps of forming an electrode film in the surface of the piezo-electric vibration reed whose outline shape has been formed thereon; forming a deadweight layer as an adjustment portion in the surface of the electrode film formed in roughly a tip portion of the detection section as well as in a part of the surface of the electrode film formed in roughly a tip portion of the drive section; adjusting the intrinsic resonance frequency of the detection section by removing at least the deadweight layer formed in roughly the tip portion of the detection section; carrying out a coarse adjustment of the intrinsic resonance frequency of the drive section by removing the deadweight layer formed in roughly the tip portion of the drive section; and carrying out a fine adjustment of the intrinsic resonance frequency of the drive section by removing the electrode film in roughly the tip portion of the drive section.

According to the method for manufacturing the vibration-type gyroscope of the present invention, the deadweight layers of the first deadweight portion and the second deadweight portion can be formed simultaneously, and it is therefore possible to reduce the steps of forming the deadweight layers which allows for the manufacturing time to be reduced. Moreover, the detection section requiring the adjustment of a large intrinsic resonance frequency is adjusted by removing a deadweight portion in a short time period, and in the drive section requiring a fine adjustment, a coarse adjustment by removing the deadweight portion and a fine adjustment by removing the electrode film are carried out sequentially to thereby carry out a fine adjustment in a short time period, allowing the adjustment to be made to a desired intrinsic resonance frequency. Namely, an accurate vibration-type gyroscope can be provided at low cost.

DETAILED DESCRIPTION OF THE PREFERRED EMBODIMENTS

Hereinafter, preferred embodiments of the vibration-type gyroscope of the present invention will be described using the accompanying drawings. Note that the present invention is not restricted to the embodiments to be described hereinafter.

Figure 1:
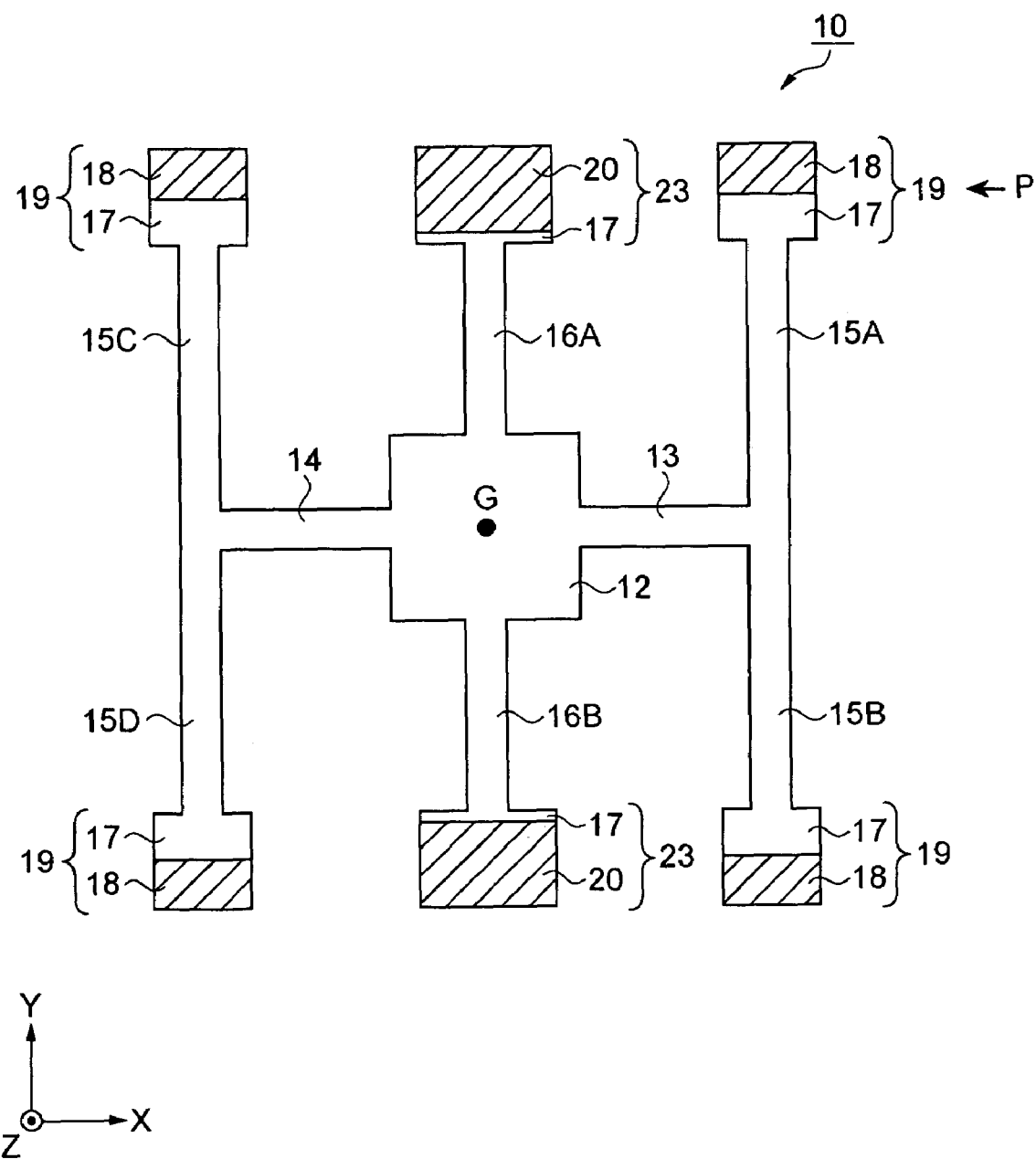
FIG. 1 is a plane view showing an outline of a piezo-electric vibration reed of a vibration-type gyroscope according to a first embodiment.

FIG. 1 is a plane view showing an outline of a piezo-electric vibration reed of a vibration-type gyroscope of a first embodiment according to the present invention.

As shown in FIG. 1, a piezo-electric vibration reed 10 is formed in an XY plane. In the first embodiment, the piezo-electric vibration reed 10 is formed of quartz, and is a Z cut quartz substrate cut in the plane direction of an X-axis and Y-axis. The X-axis is an electrical axis, the Y-axis is a machine axis, and the Z-axis is an optical axis. The piezo-electric vibration reed 10 is formed of a quartz substrate with a predetermined thickness. The plane shape of the piezo-electric vibration reed 10 is developed in the XY plane along the crystal axis of the quartz, and is in a form of 180° point symmetry relative to a central point G. The central point G is the center of gravity position of the piezo-electric vibration reed 10. Moreover, in a surface of the piezo-electric vibration reed 10, predetermined electrodes are formed, though not shown in FIG. 1.

The piezo-electric vibration reed 10 includes a rectangle-shaped base 12 that has end faces each parallel to the X-axis direction and the Y-axis direction. In the base 12, there are formed two connection arms 13 and 14 as supporting beams that extend in a direction parallel to the X-axis from the center of two end faces parallel to the Y-axis of the base 12. Furthermore, in the base 12, there are formed a detection arm 16A in the plus Y-axis direction and a detection arm 16B in the minus Y-axis direction. The detection sections extend in a direction parallel to the Y-axis from the center of the two end faces parallel to the X-axis of the base 12. At the respective tips of the connection arms 13 and 14, a pair of drive arms that extend in a direction perpendicular to the connection arm 13 are formed. At the tip of the connection arm 13, a drive arm 15A extends in the plus Y-axis direction and a drive arm 15B extends in the minus Y-axis direction. Furthermore, at the tip of the connection arm 14, a drive arm 15C extends in the plus Y-axis direction and a drive arm 15D extends in the minus Y-axis direction.

In the tips of the drive arms 15A, 15B, 15C, and 15D, a first deadweight portion 19 having a broad shape is formed. In the first deadweight portion 19, an electrode film 17, and a deadweight layer 18 formed in the surface of the electrode film 17, are formed as an adjustment portion. The deadweight layer 18 is formed to be thicker as compared with the electrode film 17. Moreover, the deadweight layer 18 is formed to fill the width in the width direction (in the X direction) of the first deadweight portion 19, and in this example is formed to be roughly half of the tip side of the first deadweight portion 19. Accordingly, the electrode film 17 occupies almost half of the deadweight portion 19 and the deadweight layer 18 occupies the remaining half. The deadweight layer 18 may be formed of metal, such as gold or silver, using a vacuum evaporation method or the like.

In the tip of the detection arms 16A and 16B, there are formed second deadweight portions 23 having a broad shape whose width is set to be wider than that of the first deadweight portion 19. By increasing the width, the area of the second deadweight portion 23 can be expanded, and the removable mass can be increased. In the second deadweight portion 23, the electrode film 17 as the adjustment portion, and the deadweight layer 20 formed in the surface of the electrode film 17, are formed. The deadweight layer 20 is formed so that a thickness thereof may be thicker as compared with the electrode film 17. Moreover, the deadweight layer 20 is formed to fill the width in the width direction (in the X direction) of the second deadweight portion 23, and in this example is formed as to occupy most of the second deadweight portion 23. Accordingly, the deadweight layer 20 occupies almost the entire deadweight portion 23, and the electrode film 17 occupies a small remaining portion. In addition, the deadweight layer 20 may be formed of metal, such as gold or silver, using a vacuum evaporation method or the like, as the first deadweight layer.

As for the drive arms 15A, 15B, 15C, and 15D, the dimensions, such as the width and length, are set so that a driving vibration may occur with a predetermined resonance frequency. Moreover, as for the detection arms 16A and 16B and the connection arms 13 and 14, the dimensions, such as the width and length, are set so that the detection vibration may occur with a predetermined resonance frequency.

Figure 2:
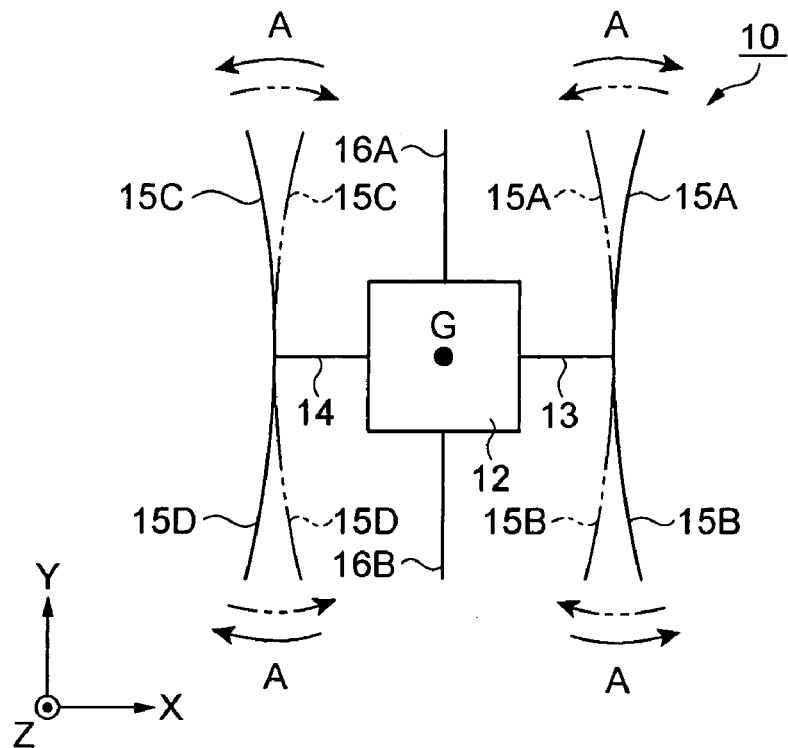
FIG. 2 is a plane view for schematically explaining the driving vibration of the piezo-electric vibration reed.
Figure 3:
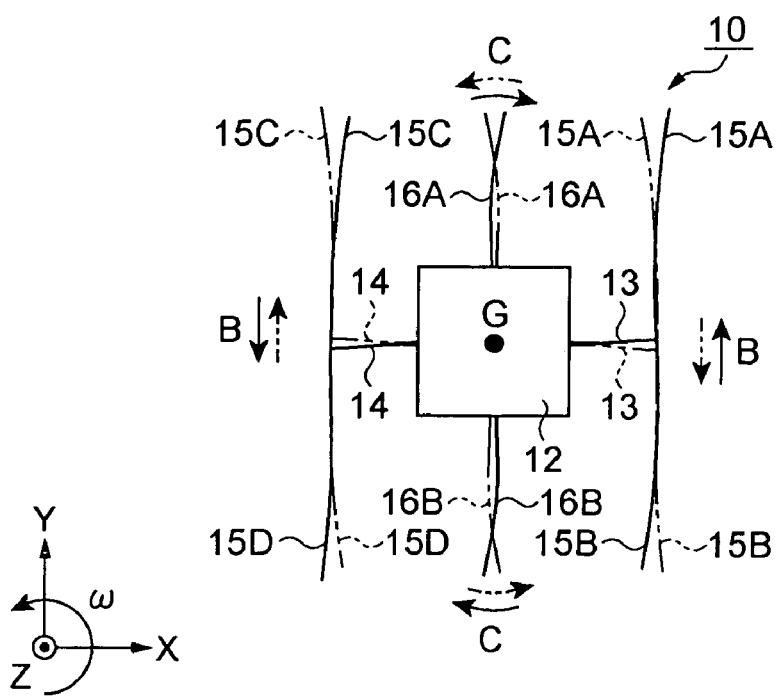
FIG. 3 is a plane view for schematically explaining the detection vibration of the piezo-electric vibration reed.

FIG. 2 and FIG. 3 are plane views that schematically explain the operation of the piezo-electric vibration reed 10 according to the first embodiment. In FIG. 2 and FIG. 3, for simple of expressing the vibration form, each vibration arm is simplified to be shown by a line. Like references indicate similar elements of FIG. 1, and the description thereof is omitted.

FIG. 2 is a view explaining the driving vibration. In FIG. 2, the driving vibration is a bending vibration in which the drive arms 15A, 15B, 15C, and 15D vibrate in the arrow A direction, and repeats a vibration mode shown by the solid line and a vibration mode shown by the chain double-dashed line at a predetermined frequency. At this time, the drive arms 15A and 15B and the drive arms 15C and 15D are vibrating in line symmetry at the Y-axis passing through the center of gravity position G Therefore, the base 12, the connection arms 13 and 14, and the detection arms 16A and 16B hardly vibrate.

FIG. 3 is a view explaining a detection vibration. In FIG. 3, the detection vibration repeats a vibration mode shown by the solid line and a vibration mode shown by the chain double-dashed line at the driving vibration frequency. The detection vibration occurs due to the fact that when a rotation angular velocity w around the Z-axis is applied to the piezo-electric vibration reed 10 in the condition when the piezo-electric vibration reed 10 is carrying out the driving vibration shown in FIG. 2, a Coriolis force in the direction shown by Arrow B acts on the drive arms 15A and 15B, and 15C and 15D.

Thereby, the drive arms 15A, 15B, 15C, and 15D carry out a vibration shown by Arrow B. The vibration shown by Arrow B is a vibration in a circumferential direction relative to the center of gravity position G. Moreover, at the same time, the detection arms 16A and 16B vibrate, in response to the vibration of Arrow B, in the circumferential direction opposite to the Arrow B as shown in Arrow C.

At this time, the peripheral portion of the base 12 does not vibrate because it is in a balanced condition as a vibration system when the drive arms 15A, 15B, 15C, and 15D and the detection arms 16A and 16B vibrate as shown in FIG. 2. Accordingly, even if a lead member for supporting the piezo-electric vibration reed 10 is coupled to the base 12, it will not affect the vibration of the piezo-electric vibration reed 10.

Next, a characteristic adjustment of the piezo-electric vibration reed will be explained with reference to FIG. 1. In order to make the measurement sensitivity favorable, the piezo-electric vibration reed 10 shown in FIG. 1 needs to have a constant vibration frequency difference (hereinafter, referred to as the "detuning frequency") between the intrinsic resonance frequency of the drive arms 15A, 15B, 15C, and 15D and the intrinsic resonance frequency of the detection arms 16A and 16B. In order to adjust this detuning frequency, a processing of removing mass from the deadweight layer 20 and electrode film 17 of the second deadweight portion 23 formed in the detection arms 16A and 16B is carried out. This changes the intrinsic resonance frequencies of the detection arms 16A and 16B. Because in the adjustment of the detuning frequency it is necessary to remove an adjustment amount from the deadweight portion 23, the region of the deadweight layer 20 occupying the second deadweight portion 23 is enlarged, which allows for the adjustment amount to be removed. In addition, the processing of removing mass from the deadweight layer 20 and electrode film 17 is carried out by processing either one of the deadweight layer 20 or the electrode film 17, or by processing both.

Furthermore, in the piezo-electric vibration reed 10 shown in FIG. 1, it is desirable to make the intrinsic resonance frequencies of the respective drive arms 15A, 15B, 15C, and 15D equal. This is for preventing a so-called vibration leak, i.e. a bending vibration of the drive arms 15A, 15B, 15C, and 15D that propagates to the detection arms 16A and 16B through the connection arms 13 and 14. The vibration leak is caused by differences (unbalance) between the intrinsic resonance frequencies of the respective drive arms 15A, 15B, 15C, and 15D. In order to resolve the differences of these intrinsic resonance frequencies, the respective intrinsic resonance frequencies of the drive arms 15A, 15B, 15C, and 15D are varied to thereby adjust the intrinsic resonance frequencies of the respective drive arms 15A, 15B, 15C, and 15D to be equal. The adjustment of the intrinsic resonance frequencies of the drive arms 15A, 15B, 15C, and 15D is carried out by removing mass from the deadweight layer 18 and electrode film 17 of the first deadweight portion 19 formed in the tip of the respective drive arms 15A, 15B, 15C, and 15D. The deadweight layer 18 and electrode film 17 are formed in almost a one-to-one ratio in the first deadweight portion 19, and a coarse adjustment is carried out by removing the deadweight layer 18 and a fine adjustment is carried out by removing the electrode film 17. In addition, the removing of mass from the deadweight layer 18 and electrode film 17 is carried out by processing either one of the deadweight layer 18 and the electrode film 17, or by processing both.

Figure 4:
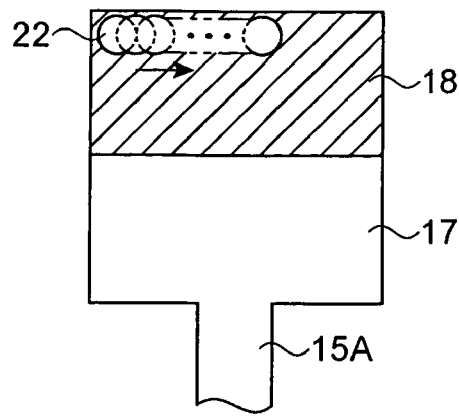
FIG. 4 is a schematic plane view showing laser processing in an adjustment portion.

In addition, in this example, the process of removing mass from the deadweight layers 18 and 20 and the electrode film 17 may include a method of melting and evaporating the deadweight layers 18 and 20 and the electrode film 17 by irradiating a laser 22, for example. As shown in a schematic view showing the laser processing of FIG. 4, the deadweight layer 18 is removed by continuously or sporadically moving the laser and the drive arm 15A relative to each other while irradiating a laser 22. FIG. 4 shows an example in which the laser 22 is irradiated and removal is carried out continuously in the arrow direction, and the processing is carried out by repeating the next row successively, or the processing is carried out by going back and forth. Removal of the electrode film 17 is carried out in the same way as the deadweight layer 18.

According to the piezo-electric vibration reed 10 of the vibration-type gyroscope shown in the first embodiment, in the drive arms 15A, 15B, 15C, and 15D, the first deadweight portion 19 as the adjustment portion is formed of the deadweight layer 18 and electrode film 17, and in the detection arms 16A and 16B the second deadweight portion 23 as the adjustment portion is formed of the deadweight layer 20 and the electrode film 17. Because the deadweight layers 18 and 20 and the electrode film 17 differ in thickness, the mass that can be removed by laser irradiation of the same area differs. Namely, the deadweight layers 18 and 20 having a large thickness can cause large mass changes, and the electrode film 17 with a small thickness can cause small mass changes. Accordingly, the adjustment of mass will be possible by carrying out large mass changes (the coarse adjustment) with the deadweight layers 18 and 20 having a large thickness in a short time period, and carrying out fine mass changes (the fine adjustment) with the electrode film 17 having a small thickness. In this way, the coarse adjustment and fine adjustment of the respective intrinsic resonance frequencies can be carried out in the adjustment portion with a relatively small area in a short time period, and an inexpensive and small-sized vibration-type gyroscope can be provided.

Figure 5A:
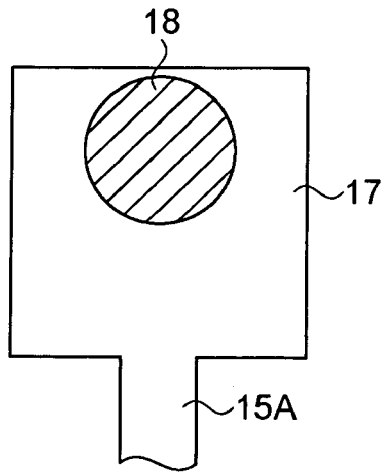
FIG. 5a through FIG. 5c are plane views showing modification examples of a deadweight layer.
Figure 5C:
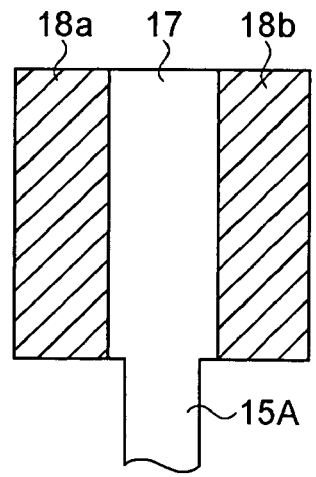
Figure 5B:
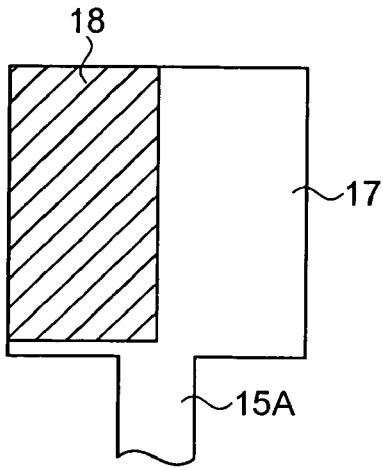

In addition, although the shape of the deadweight layer in the first embodiment has been described exemplifying a shape having a long side in the X-direction shown in FIG. 1 as an example, but the present invention should not be limited thereto. The shape can be any shape so long as a predetermined area is secured. For example, shapes as shown in FIG. 5a through FIG. 5c may be employed. In FIG. 5a, a circular-shaped deadweight layer 18 is formed in the tip portion of the drive arm 15A in which surface the electrode film 17 is formed. Moreover, in FIG. 5b, a rectangular-shaped deadweight layer 18 having a long side in the direction perpendicular to the deadweight layer shown in the first embodiment is formed in the tip portion of the drive arm 15A in which surface the electrode film 17 is formed. Moreover, in FIG. 5c, two deadweight layers 18a and 18b of a rectangle shape having a long side in the direction perpendicular to the deadweight layer shown in the first embodiment is formed in the tip portion of the drive arm 15A, in which surface the electrode film 17 is formed.

Moreover, in the processing of removing the deadweight layers 18 and 20 and the electrode film 17 of the first deadweight portion 19 and the second deadweight portion 23, it is not necessary to process all of the deadweight layer 18 and electrode film 17, and the deadweight layer 20 and electrode film 17. Any portion may be processed so long as a desired mass adjustment can be made. That is, taking the first deadweight portion 19 as an example, there are patterns where only the deadweight layer 18 is processed, or where only the electrode film 17 is processed. Further, both of the deadweight layer 18 and electrode film 17 may be processed. Among these patterns, any pattern may be employed.

Second Embodiment

Figure 6:
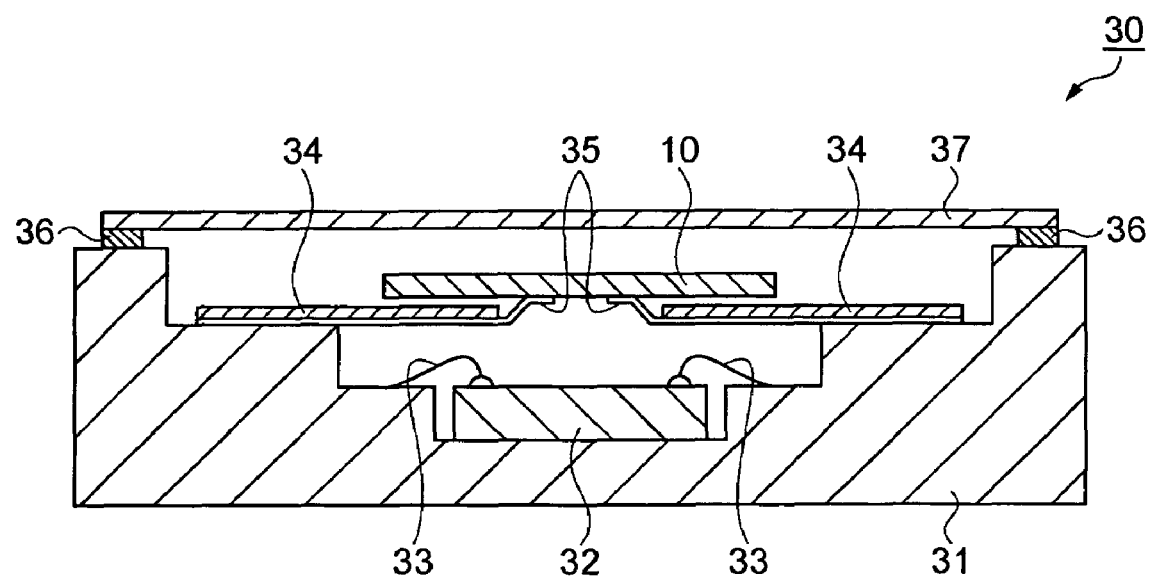
FIG. 6 is a front sectional view showing an outline of a vibration-type gyroscope according to a second embodiment.

A second embodiment of the present invention will be explained according to FIG. 6. FIG. 6 is a front sectional view showing an outline of the vibration-type gyroscope according to the present invention.

As shown in FIG. 6, the vibration-type gyroscope 30 of the present invention comprises the piezo-electric vibration reed 10, a circuit element 32 housed inside a recess of a package 31 as a retainer, a supporting substrate 34, a supporting portion 35, a covering body 37, or the like.

For example, in the package 31, preferably formed of a ceramic, the recess is formed in a three-stage structure. The circuit element 32 is fixed to a recessed portion of the package 31 with an electrically conductive adhesive (not shown) or the like, and is coupled to a connection wiring portion (not shown) formed in a middle portion of the package 31 via a metal thin wire (bonding wire) 33 by wire bonding. The circuit element 32 has at least a function that drives the piezo-electric vibration reed 10 and detect the rotation angular velocity. As for the supporting substrate 34, one end thereof is connection bonded to an upper portion of the package 31. A supporting portion 35, in which the piezo-electric vibration reed 10 described in detail in the first embodiment is coupled to one end, is coupled to the surface thereof. The supporting portion 35 is formed of a plurality of long and slender shapes of flexible sheet metal or the like, and is folded upwards at a portion projecting from the supporting substrate 34 to prevent the supporting substrate 34 from contacting the piezo-electric vibration reed 10. The piezo-electric vibration reed 10 is coupled to an end portion of the supporting portion at this folded upward section. The opening of the package 31 is sealed with a covering body or lid 37 via a connecting portion 36, for example, by using seam welding, metal heating fusion, or the like.

According to the second embodiment, the piezo-electric vibration reed 10 is mounted and housed in a package. The piezo-electric vibration reed 10 is inexpensive because the characteristic adjustment can be carried out efficiently, and it is of a reduced size because the deadweight portion used for the characteristic adjustment can be made smaller. Therefore, according to this example, small-sized and inexpensive vibration-type gyroscopes 30 can be provided.

In addition, although a configuration of housing the circuit element 32 in the package 31 has been described as an example, a configuration of not housing the circuit element 32 in the package 31 may be employed. For example, a configuration may be employed in which the circuit element 32 is mounted in a substrate (not shown) or the like on which the, vibration-type gyroscope 30 is to be mounted, and inside the package the piezo-electric vibration reed 10, the supporting portion 35 for supporting the piezo-electric vibration reed 10, and the supporting substrate 34 to which the supporting portion 35 is coupled, are housed. In addition, in this configuration the level difference formed in the recess of the package 31 may be a two-portion structure.

Moreover, although the above-described package 31 has been described showing an example of the recess having a three-portion or two-portion structure, the number of portions is not limited thereto, and a one portion structure, or a four or more portion structure may be employed.

Third Embodiment

Figure 7:
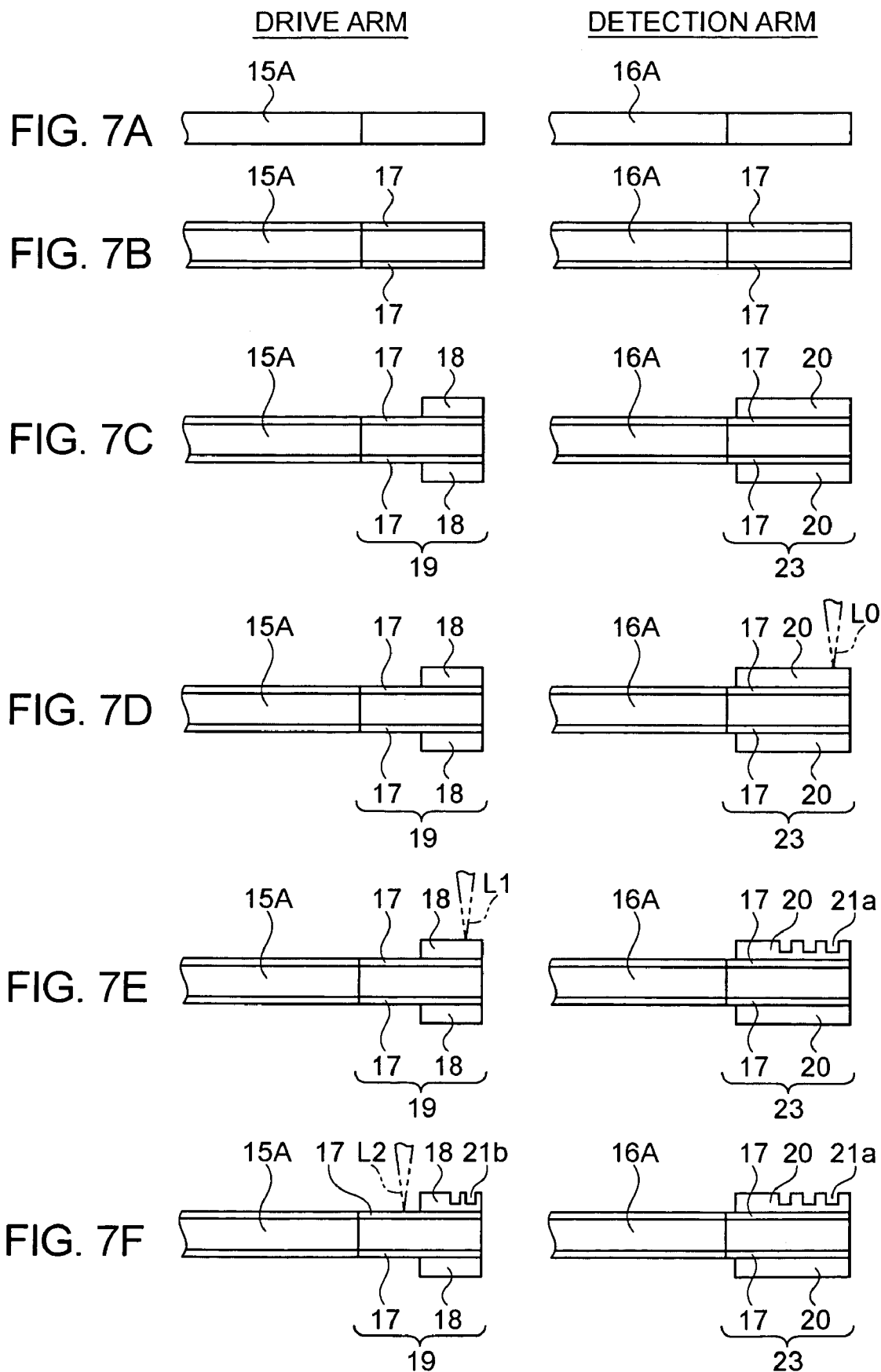
FIG. 7a through FIG. 7f are process explanatory views showing a schematic manufacturing process of a piezo-electric vibration reed of a vibration-type gyroscope according to a third embodiment, in which the left column shows front views near the tip of a drive arm, and the right column shows front views near the tip of a detection arm.
Figure 8:
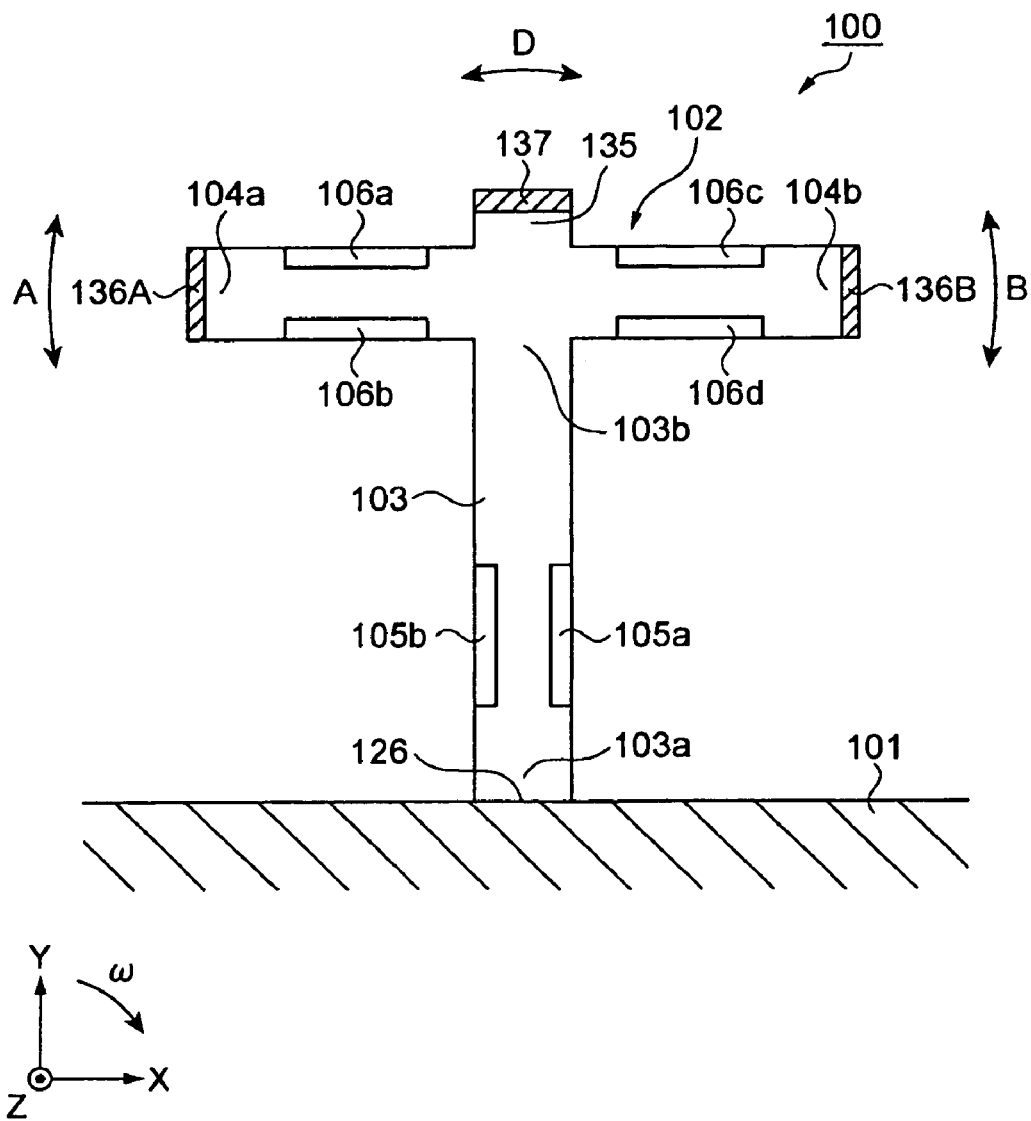
FIG. 8 is a plane view showing a piezo-electric vibration reed of a conventional vibration-type gyroscope.

Next, as a third embodiment, a manufacturing method of the piezo-electric vibration reed of the vibration-type gyroscope of the present invention will be described. FIG. 7A through FIG. 7F are explanatory views showing an outline of the manufacturing steps in the piezo-electric vibration reed 10 of the vibration-type gyroscope of the above first embodiment shown in FIG. 1. FIG. 7 is a view of the piezo-electric vibration reed 10 seen from the direction P shown in FIG. 1, where the left column shows a vicinity of the tip of the drive arm 15A, and the right column shows a vicinity of the tip of the detection arm 16A.

First, as shown in FIG. 7A, the piezo-electric vibration reed 10 made of, for example, a quartz plate, having an outline shape, such as the drive arms 15A, 15B, 15C, and 15D as the drive section, and the detection arms 16A and 16B as the detection section shown in FIG. 1, is prepared. Although the manufacturing process of the piezo-electric vibration reed 10 will be described, hereinafter, sequentially showing the drive arm 15A and the detection arm 16A as the representative, the same processing at the same step will be applied to the drive arms 15A, 15B, 15C, and 15D and the detection arms 16A and 16B, respectively, as required.

Next, as shown in FIG. 7B, the electrode film 17 is formed in the surface of the piezo-electric vibration reed 10. The electrode film 17 has a configuration in which a substrate metal layer, such as chromium (Cr), is formed in order to improve adhesion with the quartz, and a gold (Au) layer is formed in the surface thereof. Formation of the electrode film 17 can be film-formed using a vapor-depositing method, a sputtering method, or the like.

Next, as shown in FIG. 7C, in the first deadweight portion 19 of the tip portion of the drive arm 15A and in the second deadweight portion 23 of the tip portion of the detection arm 16A, the deadweight layers 18 and 20 as the adjustment portion are formed, respectively. As for the deadweight layers 18 and 20, a metal layer such as gold (Au) is formed, for example, with a vapor-depositing method, a sputtering method, or the like via a metal mask or the like, and the thickness of this layer is formed thicker than the electrode film 17. The deadweight layer 18 is formed in almost a half region of the first deadweight portion 19, and the deadweight layer 20 is formed in almost the entire region of the second deadweight portion 23.

Next, as shown in FIG. 7D, mass adjustment of the detection arm 16A is carried out to adjust the intrinsic resonance frequency of the detection arm 16A to a desired frequency. This mass adjustment is carried out for the adjustment of the detuning frequency described in the first embodiment, and is carried out by melting and evaporating the deadweight layer 20 to be removed from the detection arm 16A by irradiating a focused laser L0. In addition, if required, the electrode film 17 may be melted and evaporated to be removed.

Next, mass adjustment of the drive arm 15A shown in FIG. 7E and FIG. 7F is carried out to adjust the frequency of the intrinsic resonance frequency of the drive arm 15A to a desired frequency. This mass adjustment is carried out to prevent the so-called vibration leak, i.e. when the bending vibration of the drive arms 15A, 15B, 15C, and 15D described in the first embodiment propagates to the detection arms 16A and 16B through the connection arms 13 and 14. The intrinsic resonance frequencies of the respective drive arms 15A, 15B, 15C, and 15D are varied, thereby adjusting the respective intrinsic resonance frequencies of the drive arms 15A, 15B, 15C, and 15D to be equal. This mass adjustment is carried out, for example, by irradiating a condensed laser L1 and laser L2, thereby melting and evaporating the deadweight layer 18 and electrode film 17 formed in the drive arm 15A and removing them.

As for the mass adjustment of the drive arm 15A, first, as shown in FIG. 7E, the laser L1 is irradiated to the deadweight layer 18 formed in the drive arm 15A, thereby removing the deadweight layer 18. In the deadweight layer 18, mass that can be removed with one shot of the laser is large because the thickness thereof is large, in other words the so-called coarse adjustment is carried out in which the intrinsic resonance frequency is roughly adjusted by utilizing the capability of generating large mass changes.

Subsequently, as shown in FIG. 7F, the laser L2 is irradiated to the electrode film 17 in the portion of the first deadweight portion 19 of the drive arm 15A, thereby removing the electrode film 17. In the electrode film 17, mass that can be removed with one shot of the laser is small and a fine mass adjustment is possible because of the small film thickness. Accordingly, the so-called fine adjustment is carried out by removing the mass of the electrode film 17.

According to the manufacturing method of the piezoelectric vibration reed of the vibration-type gyroscope shown in the third embodiment described above, the deadweight layers 18 and 20 of the first deadweight portion 19 and the second deadweight portion 23 can be formed simultaneously. Therefore, the manufacturing time for forming the deadweight layers 18 and 20 can be reduced. Furthermore, according to this example, it is possible to carry out efficient adjustment by combining the coarse adjustment and fine adjustment. Namely, the detection arms 16A and 16B requiring an adjustment for a large intrinsic resonance frequency can be adjusted in a short time period by removing the deadweight layer 20. Subsequently, in the drive arms 15A, 15B, 15C, and 15D requiring a fine adjustment, it is possible to carry out the fine adjustment in a short time period by carrying out the coarse adjustment of removing the deadweight layer 18 and the fine adjustment of removing the electrode film 17 sequentially. Namely, an accurate vibration-type gyroscope can be manufactured efficiently, and can be therefore provided at low cost.

The portions whose deadweight layer 18 and deadweight layer 20 are removed become recesses 21B and 21A, as shown in FIG. 7E and FIG. 7F. The bottom faces of these recesses 21B and 21A may be inside the deadweight layers 18 and 20 as shown in FIG. 7E and FIG. 7F, or the bottom faces may be the quartz surface by removing both the deadweight layers 18 and 20 and the electrode films 17 that is formed under the deadweight layers 18 and 20. In addition, in FIG. 7E the recess 21A whose deadweight layer 20 is removed is shown being divided into three recesses, and in FIG. 7F the recess 21B whose the deadweight layer 18 is removed is shown being divided into two recesses, the present invention, however, is not limited thereto, and the recess may be one united recess by removing continuously.

Moreover, the removal of the deadweight layers 18 and 20 and electrode film 17 has been described in an example of removal-processing one surface of the drive arm 15A and detection arm 16A. The present invention, however, is not limited thereto, and the deadweight layers 18 and 20 and the electrode film 17 formed in both faces may be removal-processed.

Moreover, the mass adjustment of the drive arm 15A being carried out by using the deadweight layer 18 and electrode film 17 has been described. However, depending on the adjustment amount of mass there may be the case where removal of only the deadweight layer 18 is carried out to adjust the mass, but the removal of the electrode film 17 is not carried out. Or there may be a case where removal of only the electrode film 17 is carried out to adjust the mass, but removal of the deadweight layer 18 is not carried out.

Moreover, an equivalent effect can be obtained even if the material forming the deadweight layers 18 and 20 is formed of a material with a specific gravity larger than the material forming the electrode film 17. For example, the deadweight layers 18 and 20 may be formed of gold and the electrode film 17 may be formed of aluminum.

Moreover, although the deadweight layers 18 and 20 provided in the first deadweight portion 19 and the second deadweight portion 23, respectively, has been described, the present invention is not limited thereto, and a plurality of deadweight layers whose thickness differ may be formed in the first deadweight portion 19 and the second deadweight portion 23.

What is claimed is:

1. A vibration-type gyroscope that detects a rotation angular velocity to be applied to a piezo-electric vibration reed, the piezo-electric vibration reed comprising:

a base;

a drive section for carrying out a predetermined vibration, the drive section being provided through a supporting beam extended from the base, extending in a first plane, and including a first pair of drive arms and a second pair of drive arms;

a detection section for detecting a detection vibration caused by a Coriolis force involved in rotation of the drive section, the detection section extending from the base into the first plane and including a pair of detection arms disposed between the first pair of drive arms and the second pair of drive arms;

a first deadweight portion used for characteristic adjustment of the piezo-electric vibration reed, the first deadweight portion being formed in a tip portion of the drive section; and a second deadweight portion used for characteristic adjustment of the piezo-electric vibration reed, the second deadweight portion being formed in a tip portion of the detection section;

wherein at least one of the first deadweight portion and the second deadweight portion is formed of a plurality of adjustment portions having different mass per unit area.

2. The vibration-type gyroscope according to claim 1, wherein a mass of the first deadweight portion is set to be smaller than a mass of the second deadweight portion.

3. The vibration-type gyroscope according to claim 1, wherein in the drive section the adjustment portion is formed over an entire region in a direction roughly perpendicular to the extending direction of the drive section, and in the detection section the adjustment portion is formed over an entire region in a direction roughly perpendicular to the extending direction of the detection section.

4. The vibration-type gyroscope according to claim 1, wherein at least one of the first deadweight portion and the second deadweight portion is formed of a plurality of adjustment portions with different thicknesses.

5. The vibration-type gyroscope according to claim 4, wherein the adjustment portion in the first deadweight portion and the adjustment portion in the second deadweight portion are formed to have a same thickness using a same metal.

6. The vibration-type gyroscope according to claim 4, wherein in the plurality of adjustment portions with different thickness, a thickness of the adjustment portion at a side near the tip of the drive section or the detection section is formed thicker than a thickness of the other adjustment portions.

7. A vibration-type gyroscope comprising:
a retainer; and
the piezo-electric vibration reed according to claim 1, the piezo-electric vibration reed being mounted in the retainer.

8. A vibration-type gyroscope comprising:
a retainer;
the piezo-electric vibration reed according to claim 1, the piezo-electric vibration reed being mounted in the retainer; and
a circuit element having a circuit for driving at least the piezo-electric vibration reed, the circuit element being mounted in the retainer.

9. A method for manufacturing a vibration-type gyroscope provided with a piezo-electric vibration reed, the piezo-electric vibration reed having a drive section for carrying out a predetermined vibration and including a first pair of drive arms and a second pair of drive arms; and a detection section for detecting a detection vibration caused by a Coriolis force involved in rotation of the drive section and including a pair of detection arms disposed between the first pair of drive arms and the second pair of drive arms, the method comprising:

forming an electrode film in a surface of the piezo-electric vibration reed whose outline shape has been formed;

forming a deadweight layer as an adjustment portion in a surface of the electrode film formed in a tip portion of the detection section as well as in a part of the surface of the electrode film formed in a tip portion of the drive section;

adjusting an intrinsic resonance frequency of the detection section by removing at least the deadweight layer formed in the tip portion of the detection section;

carrying out a coarse adjustment of an intrinsic resonance frequency of the drive section by removing the deadweight layer formed in the tip portion of the drive section; and carrying out a fine adjustment of the intrinsic resonance frequency of the drive section by removing the electrode film in the tip portion of the drive section.

10. The vibration-type gyroscope according to claim 1, wherein the first deadweight portion includes a first electrode film and a first deadweight layer.

11. The vibration-type gyroscope according to claim 10, wherein the second deadweight portion includes a second electrode film and a second deadweight layer.

12. The vibration-type gyroscope according to claim 11, wherein said first electrode film includes a different mass than said second electrode film.

13. The vibration-type gyroscope according to claim 12, wherein said first deadweight portion includes a different mass than said second deadweight portion.

14. The vibration-type gyroscope according to claim 11, wherein said first electrode film includes a different geometry than said second electrode film.

15. The vibration-type gyroscope according to claim 12, wherein said first deadweight portion includes a different geometry than said second deadweight portion.

* * * * *